(12) United States Patent
Wesselhoff et al.

(10) Patent No.: US 10,915,668 B2
(45) Date of Patent: Feb. 9, 2021

(54) SECURE DISPLAY DEVICE

(71) Applicant: CRYPTERA A/S, Glostrup (DK)

(72) Inventors: Erling Wesselhoff, Praestoe (DK);
Mikael Bruun, Glostrup (DK)

(73) Assignee: Cryptera A/S, Glostrup (DK)

( * ) Notice: Subject to any disclaimer, the term of this patent is extended or adjusted under 35 U.S.C. 154(b) by 227 days.

(21) Appl. No.: 16/081,758

(22) PCT Filed: Mar. 2, 2016

(86) PCT No.: PCT/IB2016/000388
§ 371 (c)(1),
(2) Date: Aug. 31, 2018

(87) PCT Pub. No.: WO2017/149343
PCT Pub. Date: Sep. 8, 2017

(65) Prior Publication Data
US 2019/0073493 A1 Mar. 7, 2019

(51) Int. Cl.
| | | |
|---|---|---|
| G06F 21/86 | (2013.01) | |
| G06F 21/84 | (2013.01) | |
| G06F 21/83 | (2013.01) | |
| G06F 21/74 | (2013.01) | |
| G06F 3/0481 | (2013.01) | |
| G06F 3/0482 | (2013.01) | |
| G06F 3/0488 | (2013.01) | |
| G06F 21/36 | (2013.01) | |

(52) U.S. Cl.
CPC ........... *G06F 21/86* (2013.01); *G06F 3/0482* (2013.01); *G06F 3/04817* (2013.01); *G06F 3/04883* (2013.01); *G06F 21/36* (2013.01); *G06F 21/74* (2013.01); *G06F 21/83* (2013.01); *G06F 21/84* (2013.01); *G06F 2221/2149* (2013.01)

(58) Field of Classification Search
None
See application file for complete search history.

(56) References Cited

U.S. PATENT DOCUMENTS

| | | |
|---|---|---|
| 5,768,386 A | 6/1998 | Yokomoto et al. |
| 6,317,835 B1 | 11/2001 | Bilger et al. |
| 6,549,194 B1 | 4/2003 | McIntyre et al. |

(Continued)

FOREIGN PATENT DOCUMENTS

| | | |
|---|---|---|
| EP | 2775421 A1 | 3/2013 |
| WO | 2006034713 A1 | 9/2005 |

(Continued)

OTHER PUBLICATIONS

International Preliminary Report on Patentability issued in the corresponding PCT application; 7 pages.

(Continued)

*Primary Examiner* — Kambiz Zand
*Assistant Examiner* — Arezoo Sherkat
(74) *Attorney, Agent, or Firm* — Black, McCuskey, Souers & Arbaugh LPA

(57) ABSTRACT

In an example embodiment, a secure display device that includes hardware that can be positioned between a personal computer or a central processing unit and a display, such as a flat panel display. Display data from the personal computer or the central processing unit to the flat panel display is transmitted through the security display device.

22 Claims, 14 Drawing Sheets

(56) References Cited

U.S. PATENT DOCUMENTS

| | | | |
|---|---|---|---|
| 6,630,928 B1 * | 10/2003 | McIntyre | G06F 3/04886 |
| | | | 345/173 |
| 6,715,078 B1 | 3/2004 | Chasko et al. | |
| 7,963,843 B2 | 6/2011 | Martin et al. | |
| 8,052,049 B1 | 11/2011 | Doland et al. | |
| 8,100,323 B1 | 1/2012 | Crews et al. | |
| 8,108,317 B2 | 1/2012 | Siegler | |
| 8,456,429 B2 | 6/2013 | Whytock et al. | |
| 8,579,190 B2 | 11/2013 | Golueke et al. | |
| 8,833,646 B1 | 9/2014 | Crews et al. | |
| 8,840,016 B1 | 9/2014 | Schott et al. | |
| 2002/0082962 A1 | 6/2002 | Farris et al. | |
| 2010/0001967 A1 * | 1/2010 | Yoo | G06F 3/04842 |
| | | | 345/173 |
| 2011/0025610 A1 | 2/2011 | Whytock et al. | |
| 2014/0013406 A1 * | 1/2014 | Tremlet | G06F 21/32 |
| | | | 726/5 |
| 2014/0150056 A1 * | 5/2014 | Williams | G06F 21/57 |
| | | | 726/2 |
| 2014/0195429 A1 | 7/2014 | Paulsen | |
| 2014/0201087 A1 | 7/2014 | Shin et al. | |
| 2014/0253505 A1 | 9/2014 | Vincent et al. | |
| 2015/0161579 A1 * | 6/2015 | Madden | G06F 21/606 |
| | | | 705/18 |

FOREIGN PATENT DOCUMENTS

| | | |
|---|---|---|
| WO | 2011051757 A1 | 10/2009 |
| WO | 2013081406 A1 | 6/2013 |

OTHER PUBLICATIONS

Office action issued in the corresponding European application; 4 pages.

* cited by examiner

SECURE DISPLAY DEVICE

CROSS-REFERENCE TO RELATED APPLICATION

This application claims the benefit under 35 U.S.C. § 371 to international application PCT/IB2016/000388 filed on 2 Mar. 2016. The contents of the aforementioned application are hereby incorporated by reference in their entirety.

TECHNICAL FIELD

The present disclosure relates generally to display devices.

BACKGROUND

A touch screen allows the user of a terminal to enter a menu selection or data by placing a finger or other object at a location on the display screen that corresponds to the menu item, function or data numeral to be entered. A touch sensitive element detects the coordinates of the touch event and the meaning of the touch event is determined by the coordinate location and the corresponding menu or data button displayed on the screen associated with the touch sensitive element. When a touch screen is utilized to enter data such as a secret personal identification ("PIN") number, the PIN number should be protected by encryption prior to being communicated to any external resource.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
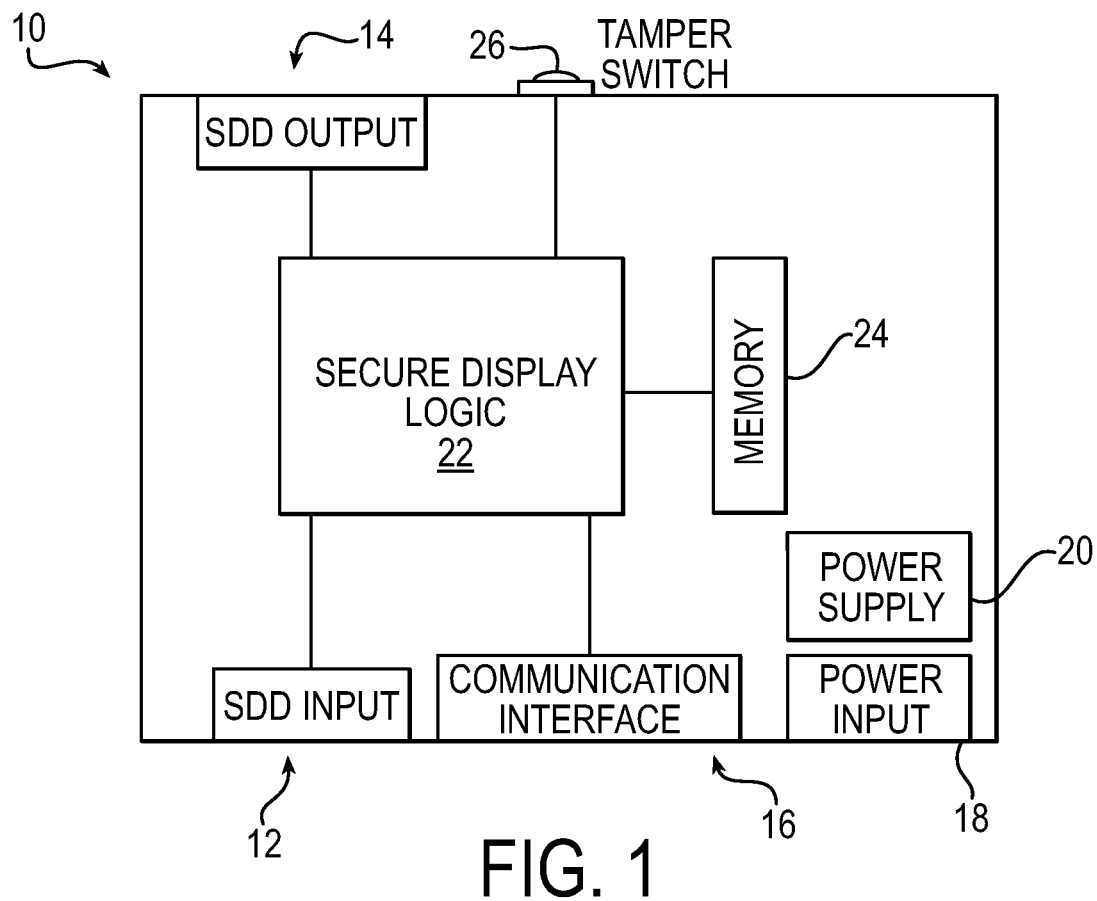
FIG. 1 is a block diagram illustrating an example of a secure display device.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a secure display device (SDD) that includes hardware that can be positioned between a computing device or a processor, and a display such as a flat panel display (FPD). Display data from the PC/CPU to the FPD is transmitted through the SDD.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a block diagram illustrating an example of a secure display device (SDD) 10. The secure display device 10 comprises a SDD input 12, a SDD output 14, a communication interface 16, and a power input 18 coupled with a power supply 20 that are coupled with a secure display logic 22. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor. In an example embodiment, the secure display device further comprises a memory 24. In an example embodiment, the secure display device 10 further comprises a removal detector (e.g., a tamper switch) 26. In the illustrated example, the SDD input 12, the SDD output 14, the communication interface 16, the power input 18, power supply 20, the secure display logic 22, the memory 24, and the tamper switch 26 are mounted on a printed circuit board (PCB) 28.

In an example embodiment, the SDD input 12 obtains display data (such as, for example, graphical data) from an application being executed by a Central Processing Unit (CPU) or a Personal Computer (PC) through a display controller. The SDD input 12 may employ any suitable wired or wireless protocol. For example, in particular embodiments, the SDD input 12 supports a LVDS (Low Voltage Differential Signaling) Graphics port and is field programmable for different formats.

The SDD output 14 is operable to be coupled with a display. The SDD output 14 may employ any suitable wired or wireless protocol to communicate with the display and is field programmable. For example, the SDD output 14 can support LVDS.

Figure 6:
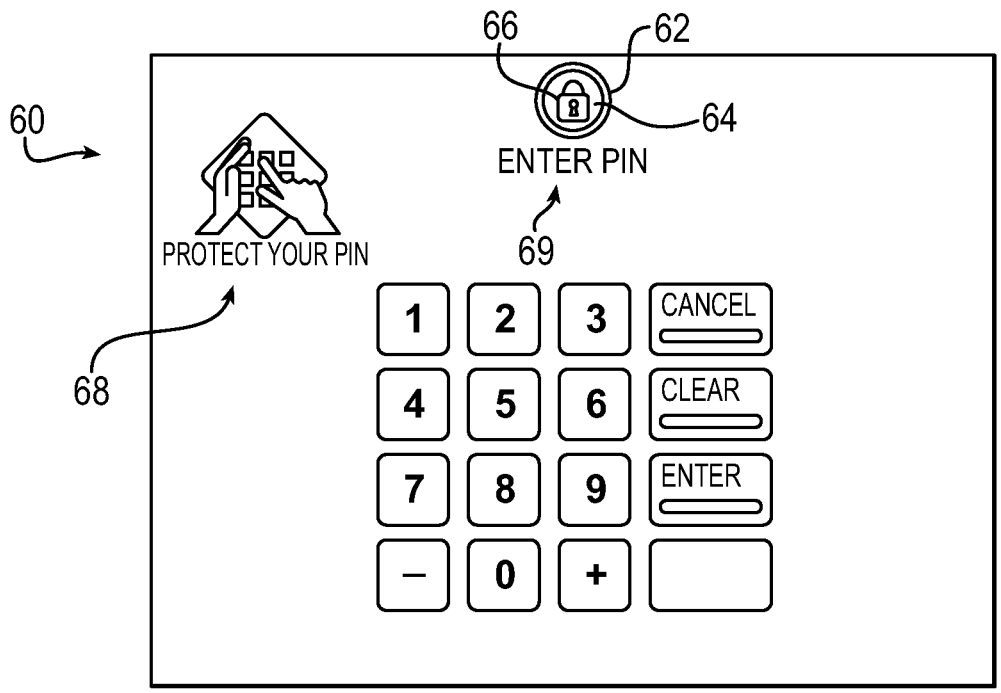
FIG. 6 is an example of a screen display for a protected data entry mode.
Figure 7:
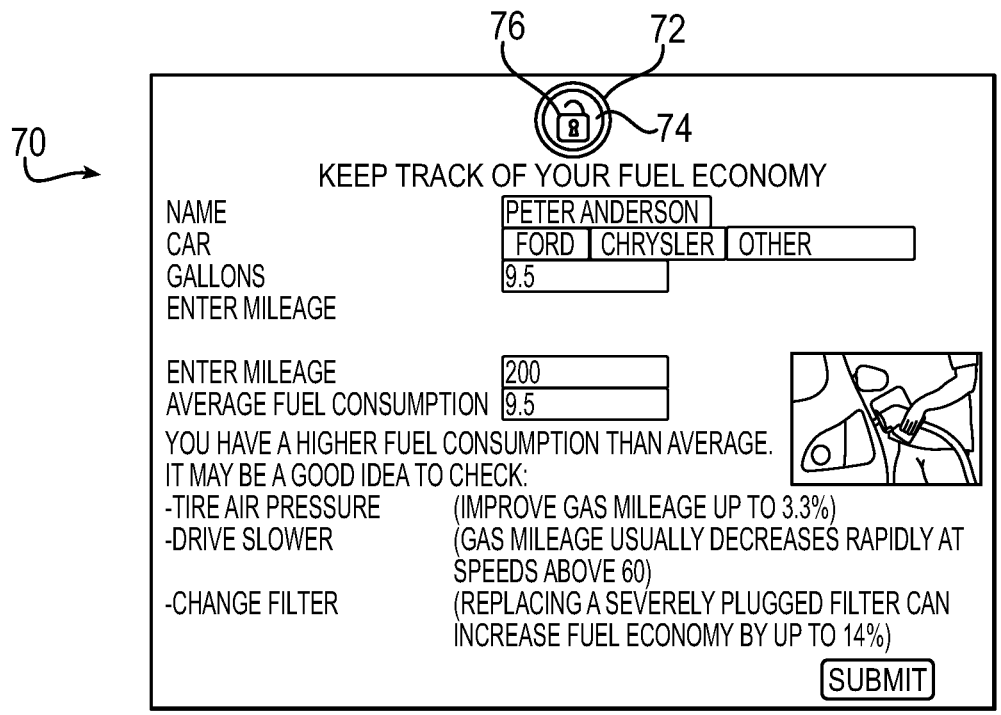
FIG. 7 is an example of a screen display for an unprotected data entry mode.

In an example embodiment, the secure display logic 22 is operable to obtain data representative of a screen display via the SDD input 12. The secure display logic 22 is operable to selectively output the data representative of the screen display via the screen display output based at least in part on an operational mode. For example, in a first operation mode (which may also be referred to herein as a "partial takeover" mode), the secure display logic 22 passes the data representative of the screen display to the screen display output 14 and also causes data to be passed through the screen display output 14 that is representative of a predefined graphic that will at least partial overlay the screen display. FIGS. 6 and 7 described herein infra illustrate examples of a partial overlay of a screen display.

In an example embodiment, the secure display logic 22 can operate in a second operational mode where the output of the display coupled with SDD output 14 is controlled (which may be referred to herein as "takeover" mode). In this operational mode, a selected screen is provided to the display. Data representative of a screen display received in this operational mode is ignored or discarded.

In an example embodiment, the secure display logic 22 can operate in a third mode where data representative of a screen display is passed to the screen display output 14 to be displayed unmodified (which may also be referred to herein as a "pass through" mode). As will be discussed in more detail herein, an example embodiment, the third display mode may be allowed in limited circumstances. For example, where the display is a touch screen display, the third display mode may be limited to times when inputs to the touch screen display are encrypted. As another example, the third display mode may be limited to times when the touch screen is operating in a "Restricted Touch" mode where the touch screen acts as a virtual key and the location (coordinates) of where a touch screen input was received are not provided. For example, while watching a video in full screen ("pass through") mode, if an input is received on the touch screen, the touch screen merely provides an indication that the screen was touched to pause the video, and the secure display logic may switch to another operational mode (e.g., the first operational mode) while the video is paused. The screen display logic 22 may obtain data indicating the current operating mode of a touch screen from the touch screen or a cryptographic screen display element (not shown, see e.g., FIG. 3) associated with the touch screen via communication interface 16.

In another example embodiment, a Restricted Touch mode may restrict touch locations available on a screen. This can prevent PIN Luring/Phishing attacks during normal application mode. For example, a PIN Luring/Phishing attack may try to change a standard application picture (e.g., graphic) to a false PIN pad picture and thereby pretend to be in a PIN entry mode. This Restricted Touch mode, by restricting screen locations for input, can prevent entry of some of the numbers of the false PIN pad As will be described in more detail herein (see e.g., FIGS. 6 and 7 infra), the screen output provided to a display via SDD output 12 may include visual representation to indicate whether the touch screen is in a protected or unprotected mode. The visual representation may include an icon. For example, an unlocked padlock would indicate an unprotected mode while a locked padlock would indicate a secure mode. In addition, the visual representation may include a color scheme to indicate whether the touch screen is in a secure or insecure operating mode. For example, an icon with a green background may indicate a protected mode while an icon with a red background may indicate an unprotected mode. As yet another example, the visual representation may include text indicating the mode (e.g., protected mode, unprotected mode, application mode, test mode, etc.).

As will be illustrated herein infra, the removal detector (or tamper switch) 26 can protect a connection between the SDD output 14 and a display device. The removal detector may be operable to detect changes in force, pressure, magnetism, capacitance, and inductance, or any combination thereof, between the SDD output 14 and the display device coupled with the SDD output 14. In an example embodiment, the removal detector 26 comprises a mesh with electrically conductive tracks.

In an example embodiment, the secure display logic 22 is operable to ignore data received via the SDD input 12 and provide data representative of a predefined screen output to SDD output 14 responsive to the removal detector 26 detecting tampering. In particular embodiments, the secure display logic 22 is operable to send a message via the SDD input 12, the communication interface 16, or both, to a predefined destination (such as, for example, a host CPU) responsive to the removal detector 26 detecting tampering.

In an example embodiment, the communication interface 16 is operable to receive device configuration data, device setup data, graphics, or device initialization commands. The communication interface is field programmable and can support I2C (Inter integrated Circuit), SPI (Serial Peripheral Interface), UART (Universal Asynchronous Receiver-Transmitter), 1 wire, or any other suitable protocol. In particular embodiments, communications with the communication interface 16 are cryptographically controlled. For example, wherein commands received by the communication interface are encrypted or authenticated by message authentication code (MAC) or signature schemes. Cryptographic mechanisms could be done by one of a group consisting of Advanced Encryption Standard (AES), Triple Data Encryption Standard (3DES), Rivest, Shamir, and Adleman (RSA), and Elliptical Curve Cryptography (ECC).

In an example embodiment, control of the secure display logic 22 may be accomplished by an external device via communication interface 16. For example, a secure cryptographic device associated with a display or a trusted application, which in an example embodiment may employ cryptographically secure communications, may provide data to the secure display logic 22 to select the operating state, or may send data indicating the operating state of the display. For example, secure display logic 22 may be configured to limit the availability of the pass through mode to times when touch inputs are encrypted order restricted touch control. Signals from a secure cryptographic device associated with the screen can indicate whether screen inputs are encrypted.

Figure 2:
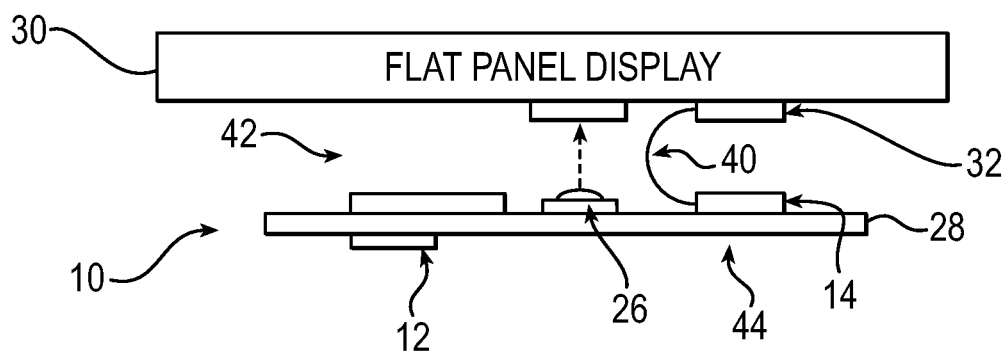
FIG. 2 is a block diagram illustrating an example of a secure display device coupled with a flat panel display.

FIG. 2 is a block diagram illustrating an example of a secure display device 10 coupled with a flat panel display 30. This example illustrates the PCB 28 where components on a first side 42 of the PCB 28 are considered secure. In the illustrated example, the SDD output 14 and input 32 are located on the first side 42 of the PCB 28. This prevents access to the SDD output 14, input 32, and the link (e.g., cable) 40. Removal detector (tamper switch 26) protects the first (secure) side 42 of the PCB 28. For example, removal of the PCB 28 from the flat panel display 30 will trigger the removal detector 26. The second side 44 of the PCB 28 is considered insecure.

Figure 3:
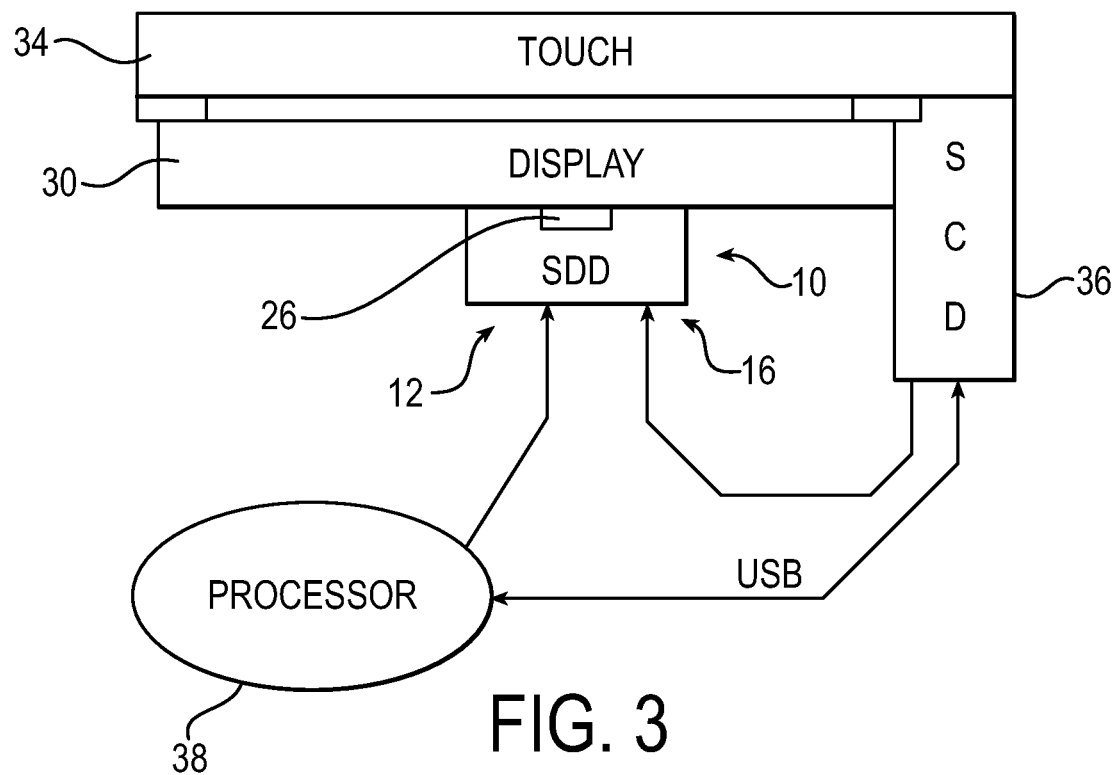
FIG. 3 is a block diagram illustrating an example of the secure display device coupled with a touch screen receiving display input from an application running on a processor.

FIG. 3 is a block diagram illustrating an example of the secure display device 10 coupled with a touch screen 34 receiving display input from an application running on a (host) processor (or computer) 38. Input from the touch screen 34 is passes through a secure cryptographic device (SCD) 36. The output of SCD 36 may be encrypted data or clear text. A universal serial bus (USB) connection is employed to couple the SCD 36 with the processor 38. The processor 38 provides data representative of display data (e.g., pictorial or graphical data) to SDD input 12. The removal detector 26 is employed to determine if the SDD 10 is securely coupled with the display 30. In an example embodiment, the removal detector is operable to disable the SDD 10 upon detecting removal of the SDD 10 from the display 30 or tampering of the SDD 10

In particular embodiments, the SCD 36 may also be coupled with the SDD 10 via the communication interface. This can allow the SDD 10 to determine whether inputs received via the touch screen 34 are being encrypted. Although the SDD 10 and SCD 36, and processor 38 are illustrated as separate components, those skilled in the art should readily appreciate that in at least one embodiment any of the SDD 10, SCD 36, and processor 38 may be combined into a single component. For example, in one embodiment, the SDD 10 and SCD 36 may be combined. In another embodiment, SDD 10, SCD 36, and processor 38 may be combined.

For example, SCD 36 can indicate to SDD 10 that it is operating in a clear text mode. The SDD will limit operations to the first (partial takeover) mode and the second (takeover) mode while the SCD 36 is operating in clear text mode. The SDD 10 may allow operation in the third (pass through) mode when the SCD 36 is operating in either an encrypted mode (where screen coordinates are sent encrypted) or in Restricted mode (where only data indicating whether the touch screen 34 was touched or locations available for touch input on touch screen 34 are limited). In particular embodiments, a trusted application running on processor 38 may be allowed to select the operational mode of SDD 10, SCD 36 or both SDD 10 and SCD 36.

Figure 4:
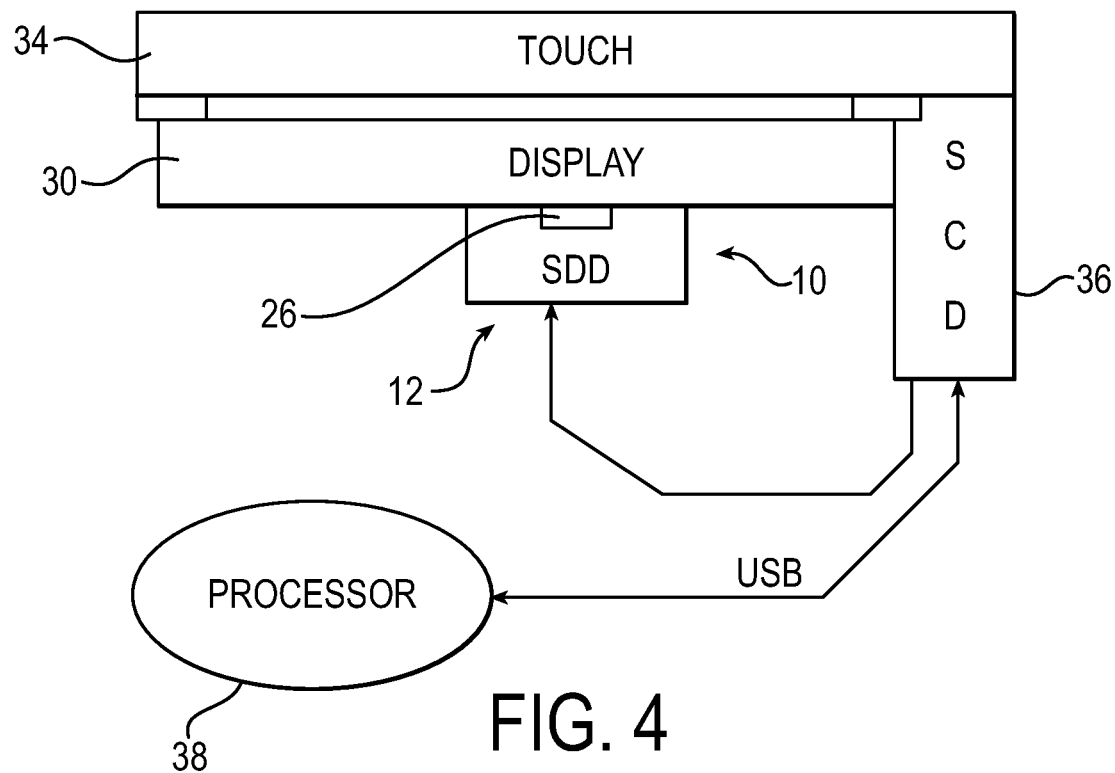
FIG. 4 is a block diagram illustrating an example of the secure display device coupled with a touch screen receiving display input from a secure cryptographic device.

FIG. 4 is a block diagram illustrating an example of an alternative configuration of the secure display device 10 being coupled with touch screen 34. In this embodiment, graphical data is provided to the SDD input 12 by the SCD 36.

Figure 5:
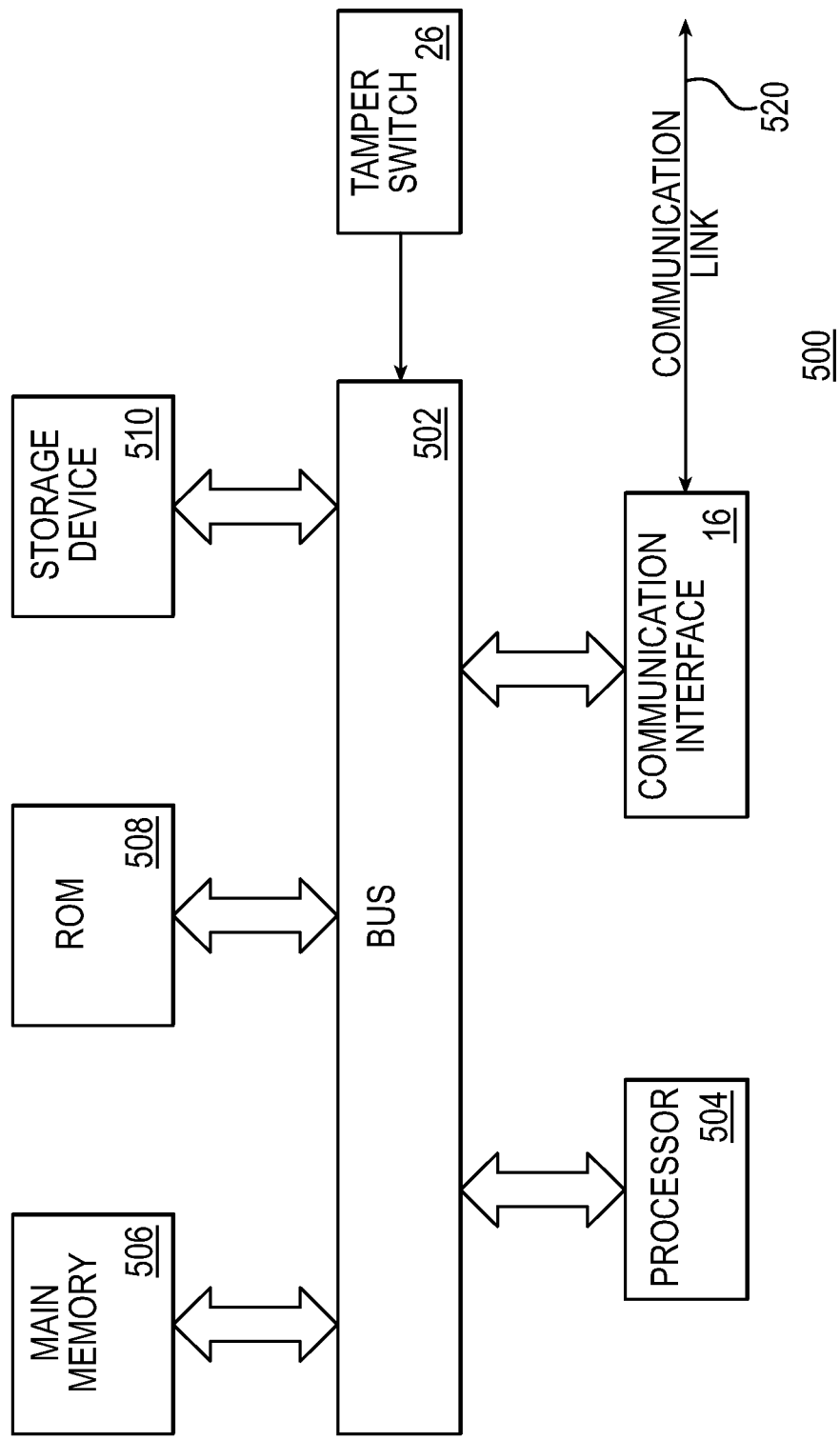
FIG. 5 is a block diagram that illustrates a computer system upon which an example embodiment may be implemented.

FIG. 5 is a block diagram that illustrates a computer system 500 upon which an example embodiment may be implemented. For example, computer system 500 may be employed to implement the functionality of SDD 10 described in FIGS. 1-4.

In an example embodiment, the computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as Flash disk a magnetic disk or optical disk, is provided and coupled to bus 502 for storing information and instructions.

In an example embodiment, communication interface 16 allows for the receipt of configuration data, setup data, commands, or any other suitable communications. A communication link 520 may be coupled with any suitable device, such as SCD in FIG. 3

In particular embodiments, removal device (such as a tamper switch) 26 is coupled to bus 502. If the removal detector (or tamper switch) 26 detects tampering (or removal) of the computer system 500 from a display panel, the removal device 26 may send a message to processor 504.

An aspect of the example embodiment is related to the use of computer system 500 for implementing a secure display device. According to an example embodiment, implementing a secure display device is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

FIG. 6 is an example of a screen display 60 for a first security (e.g., secure) state. In this example, an icon 62 provides a visual representation of the security state. The icon 62 may include a background 64. The color of the background 64 may be selected (for example green) to indicate that data (e.g., PIN) entry is secure (e.g., a protected mode). The icon may also include a locked padlock 66, which in the locked position indicates touch screen inputs are secure. Additional text 68, 69 may also be employed to indicate that the display is in a protected mode.

FIG. 7 is an example of a screen display 70 for a second (e.g., insecure) state. The icon 72 in the unprotected mode is different than the icon in the protected mode. For example, the background 74 may be of a different color (for example red) than the color of the background 64 in FIG. 6. In addition, the icon 72 comprises an unlocked padlock 76.

Although the examples in FIGS. 6 and 7 use padlocks 66, 76 to indicate whether the display is in a protected or unprotected state, those skilled in the art should readily appreciate that any suitable icon may be employed to indicate secure and unprotected modes. The screen displays in FIGS. 6 and 7 can be employed to prevent a customer from inadvertently disclosing a PIN to a malicious program. For example, when operating in an unprotected mode, at least a portion of the screen display is not controlled or that touch screen inputs are not being encrypted, or both. The icon 72 in FIG. 7 can be employed to indicate an unprotected mode.

In particular embodiments, screen displays 60, 70 may vary over time. For example when first changing from a protected mode to an unprotected mode, icon 70 may appear in a popup window in the middle of the screen for a predefined time period, move to the top of the screen, shrink and/or move to another location, such as a corner of the screen display.

In an example embodiment, additional information may be obtained from icons 62, 72. For example, by clicking on icon 62 or 72, a help screen may displayed that indicates the current security state, and in particular embodiments may indicate the reason for the current security state (e.g., whether screen inputs are encrypted or restricted).

Figure 8:
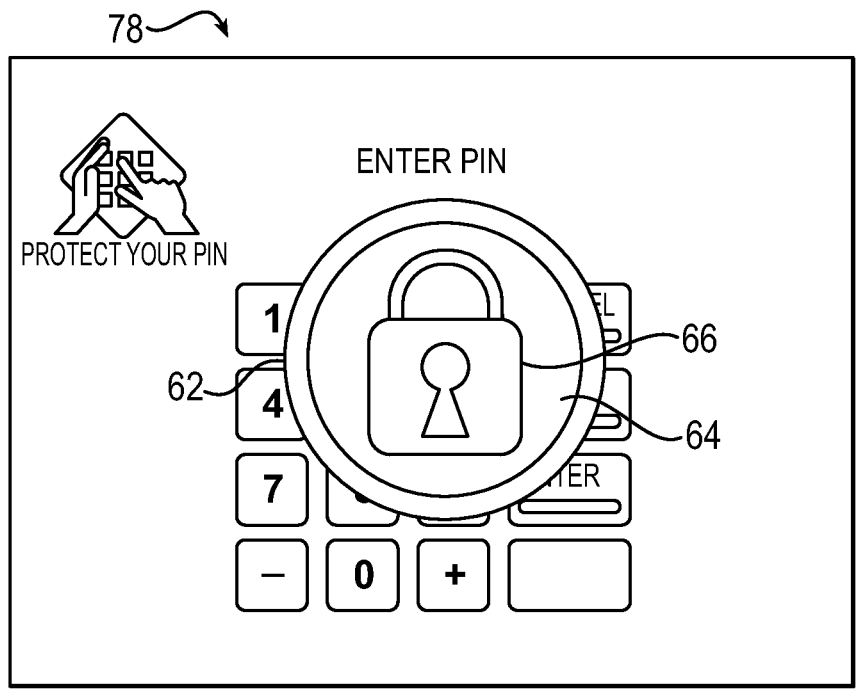
FIG. 8 illustrates an example of a display when entering a protected mode.

FIG. 8 illustrates an example of a display 78 when entering a protected mode. The icon 62 appears in the middle of the screen and overlays the output for a short period of time to bring attention to the user that the display 78 is now in a protected (e.g., PIN entry) mode. After a time period, the screen may change to the screen 60 previously illustrated in FIG. 6.

Figure 9:
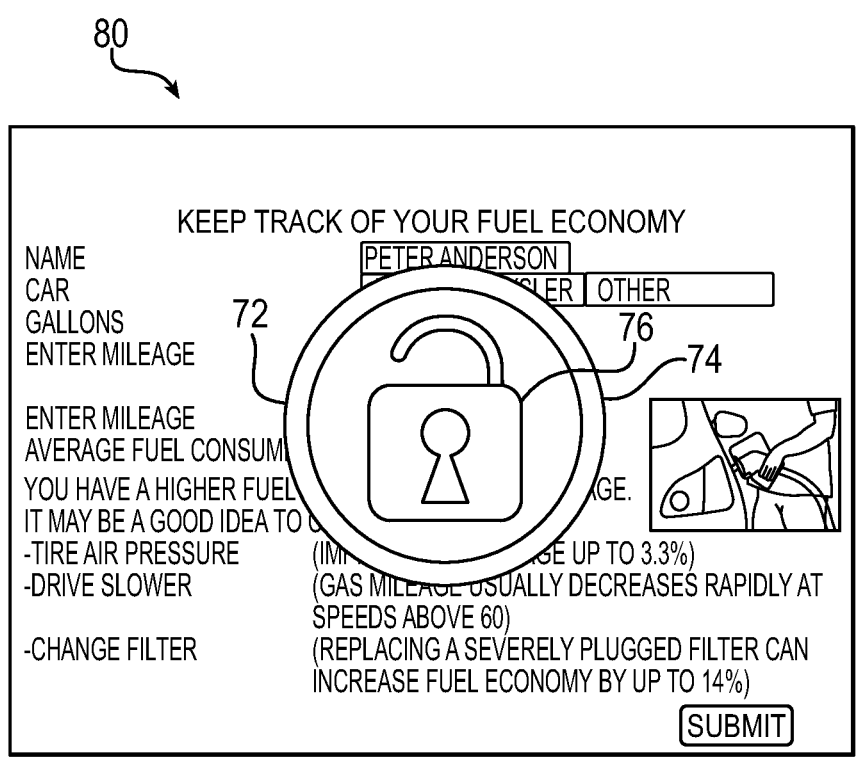
FIG. 9 illustrates an example of a display when entering an unprotected mode.

FIG. 9 illustrates an example of a display 80 when entering an unprotected mode. The icon 72 appears in the middle of the screen and overlays the output for a short period of time to bring attention to the user that the display 80 is now in an unprotected (e.g., not a PIN entry) mode. After a time period, the screen may change to the screen 70 previously illustrated in FIG. 7.

Figure 10:
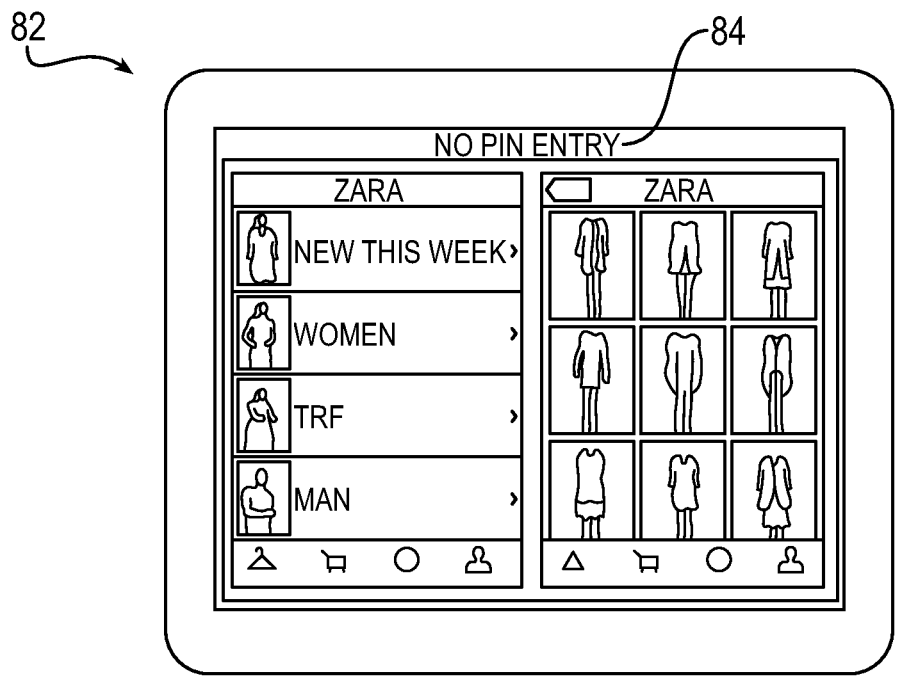
FIG. 10 illustrates an example of display in an unprotected mode employs a colored border to indicate the mode.

FIG. 10 illustrates an example of display 82 presented on a display while in an unprotected mode. This display 82 employs a colored border 84 around a border to indicate the unprotected mode. For example the border 84 may be a first color (e.g., green) to indicate a protected mode. Display 82 may be presented in a partial takeover mode, where a SDD generates the border.

Figure 11:
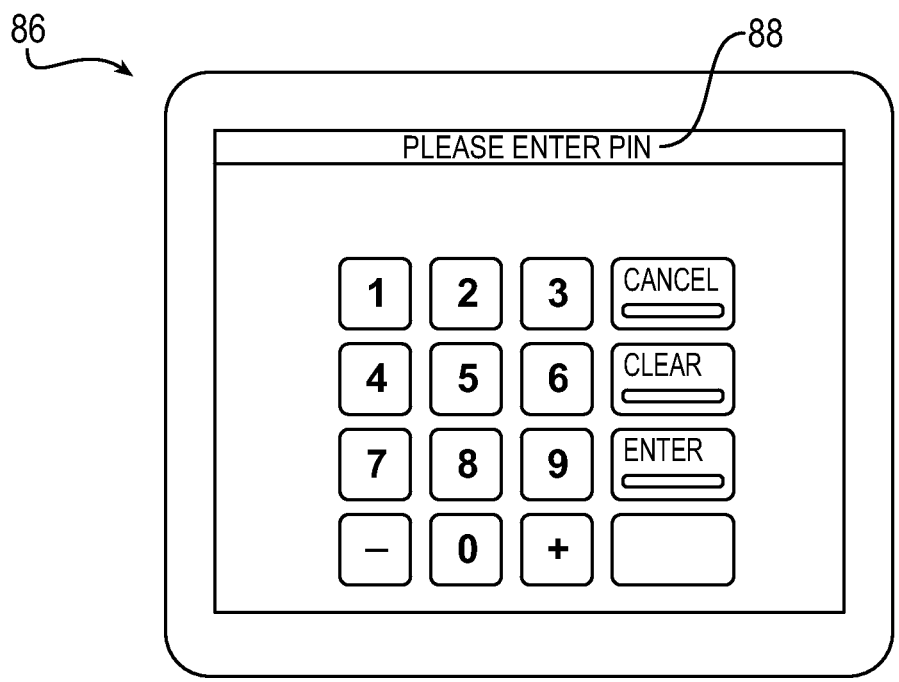
FIG. 11 illustrates an example of a display in a protected mode that a colored border to indicate the mode.

FIG. 11 illustrates an example of a display 86 in a protected mode. The display 86 employs a colored border 88 to indicate the mode. For example, the border 88 may be a second color (e.g., red, a color different than the first color employed in FIG. 10) to indicate an unprotected mode. Display 86 may be presented in a partial takeover mode, where a SDD generates the border.

Figure 12:
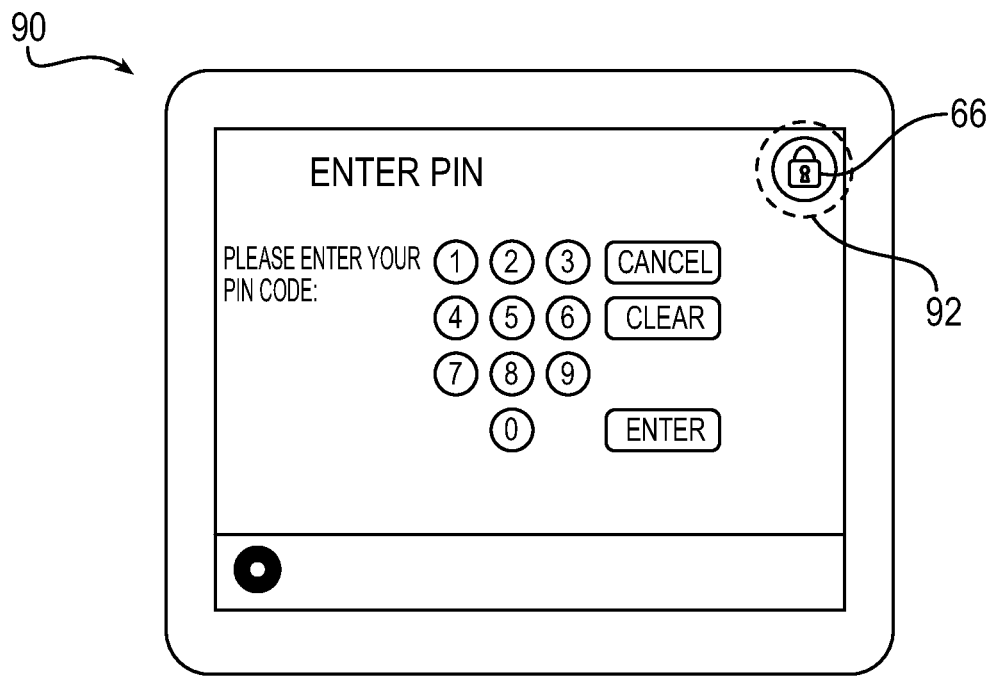
FIG. 12 illustrates yet another example of a display employing an icon to indicate a secure mode.

FIG. 12 illustrates yet another example of a display 90 employing an icon in a corner 92 of the display 90 to indicate a secure mode. In the illustrated example, the icon is a locked padlock 66, however, those skilled in the art should readily appreciate that any suitable icon may be employed. Moreover, those skilled in the art should readily appreciate that the position of the icon (corner 92) was selected merely for ease of illustration as the icon may be located in any suitable location.

Figure 13:
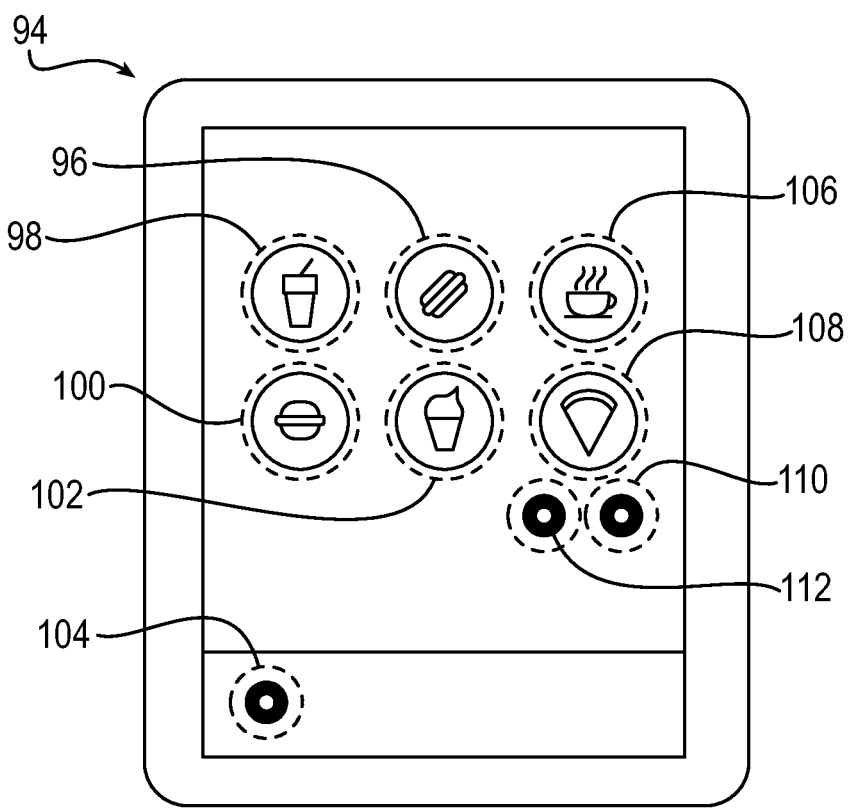
FIG. 13 illustrates an example of a touch screen in a Restricted Touch mode.

FIG. 13 illustrates an example of a touch screen display 94 in a Restricted (or Limited) Touch mode. In this mode, inputs are limited to areas 96, 98, 100, 102, 104, 106, 108, 110, 112. Inputs from other areas of the display 94 are ignored. The restricted touch screen may be implemented by a SCD, such as SCD 36 described in FIGS. 3 and 4.

FIGS. 14-24 illustrate an example of a sequence of displays that can be used in a fuel pump application. The first display 114 in the sequence prompts a user to either buy petrol (fuel) or apply for a petrol (e.g., credit) card via icons 116 and 118 respectively. The unlocked padlock 76 icon is displayed to indicate to the user that inputs at the display 114 are not protected.

Figure 14:
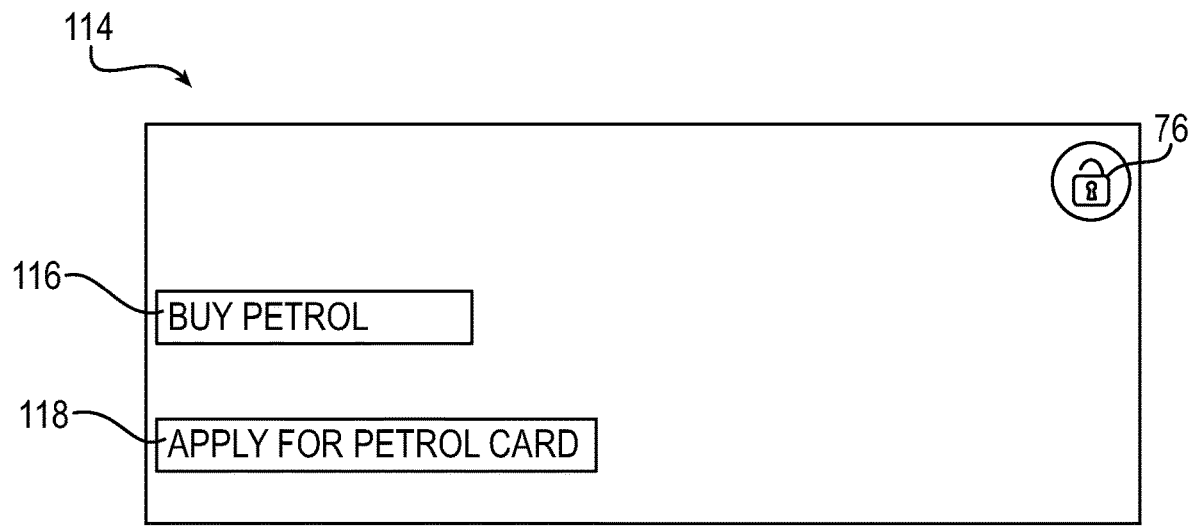
FIGS. 14-24 illustrate an example of a sequence of displays that can be used in a fuel pump application.
Figure 15:
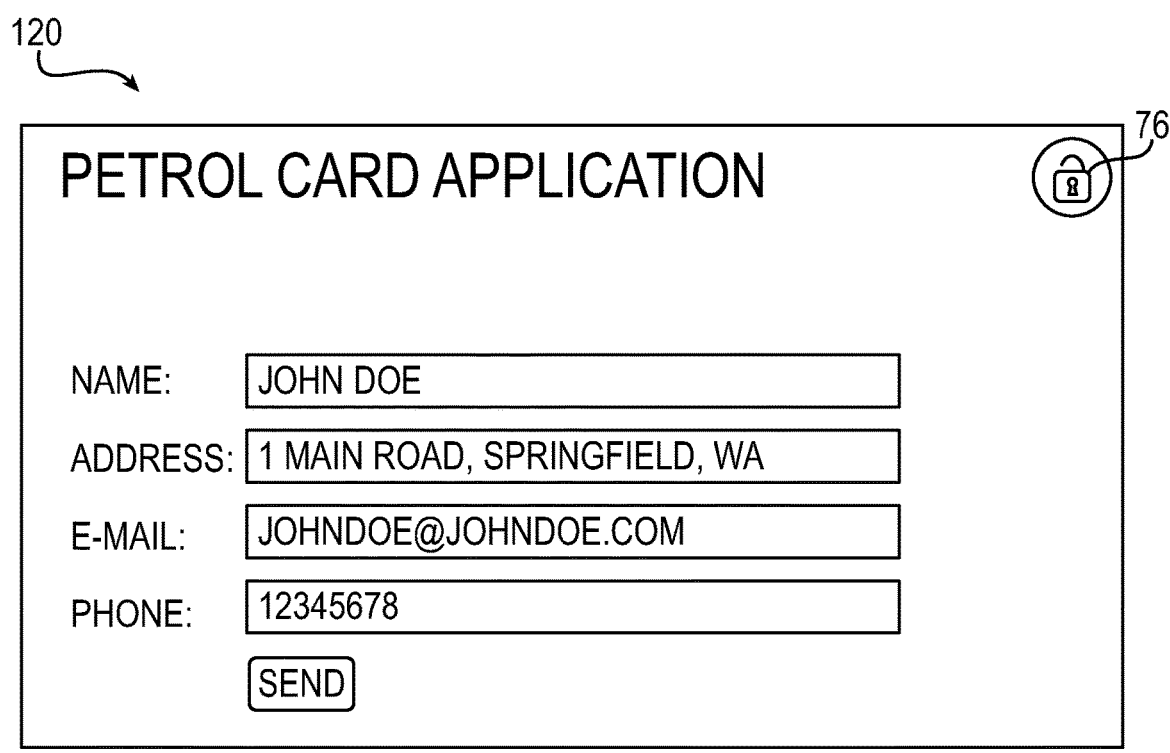
Figure 16:
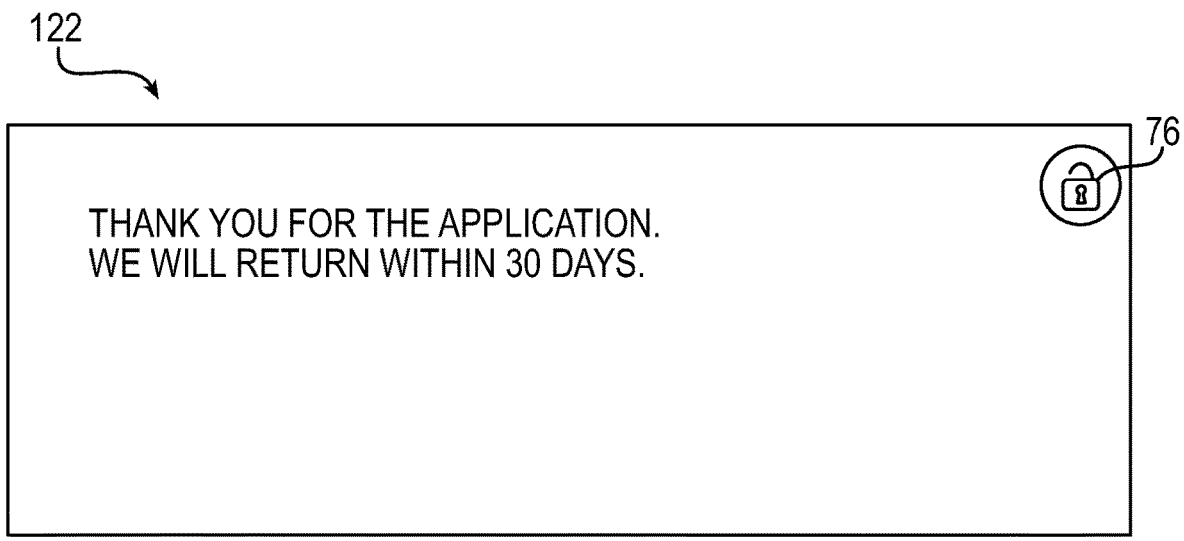

The display 120 illustrated in FIG. 15 is presented when the user selects icon 118 in the display 114 presented in FIG. 14. The display 120 provides fields for a user to enter their name, address, email address and a phone number. The unlocked padlock 76 indicates that data entered into this screen is not protected. After the user enters their data and presses the submit button, the display 122 is presented to the user providing the user with information regarding the processing of the application. The unlocked padlock 76 indicates that any data entered into this screen is unprotected.

Figure 17:
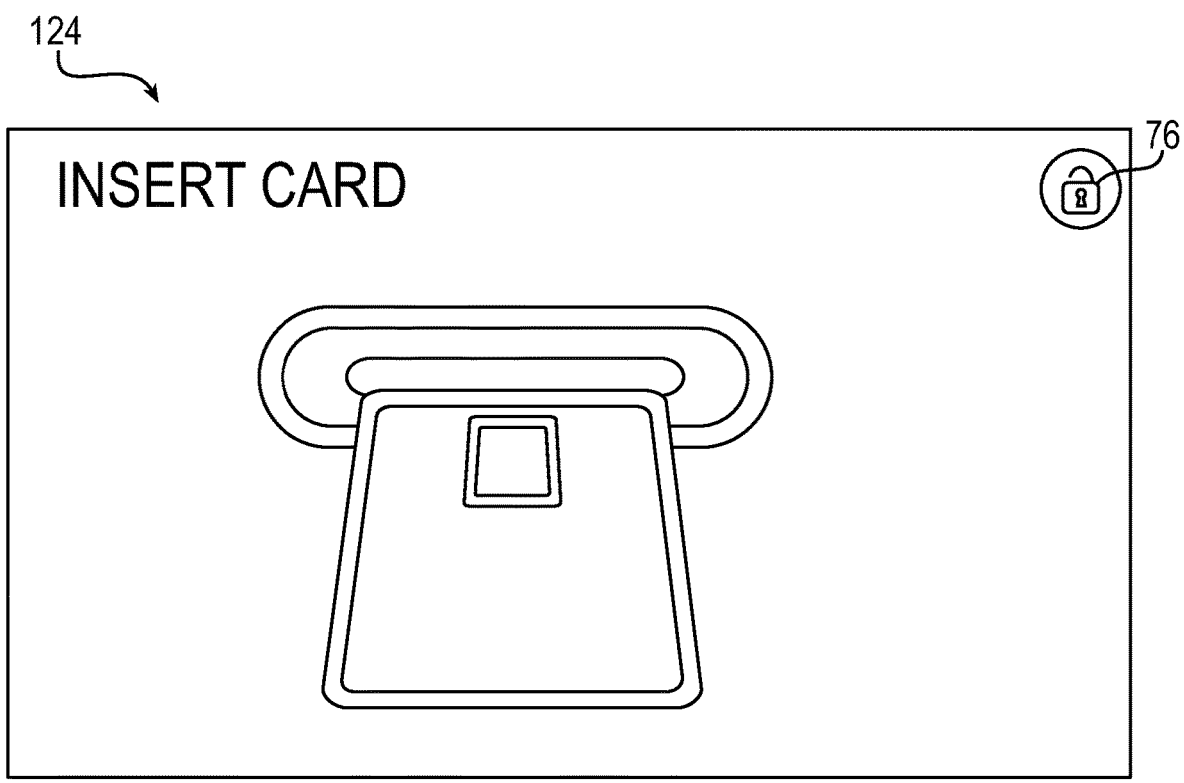

The display 124 illustrated in FIG. 17 is presented when the user selects icon 116 in the display 114 presented in FIG. 14. The display 124 instructs the user to insert their card (e.g., petrol, fuel, credit, or any suitable card) for making the purchase. Note that although the icon presented in display 124 shows a card going into a magstripe reader, this is merely or ease of illustration as wireless cards may also be employed. The unlocked padlock 76 indicates that data entered into this screen is unprotected. Although the display 124 is unprotected, in an example embodiment, the card reader may be an encrypting card reader.

Figure 18:
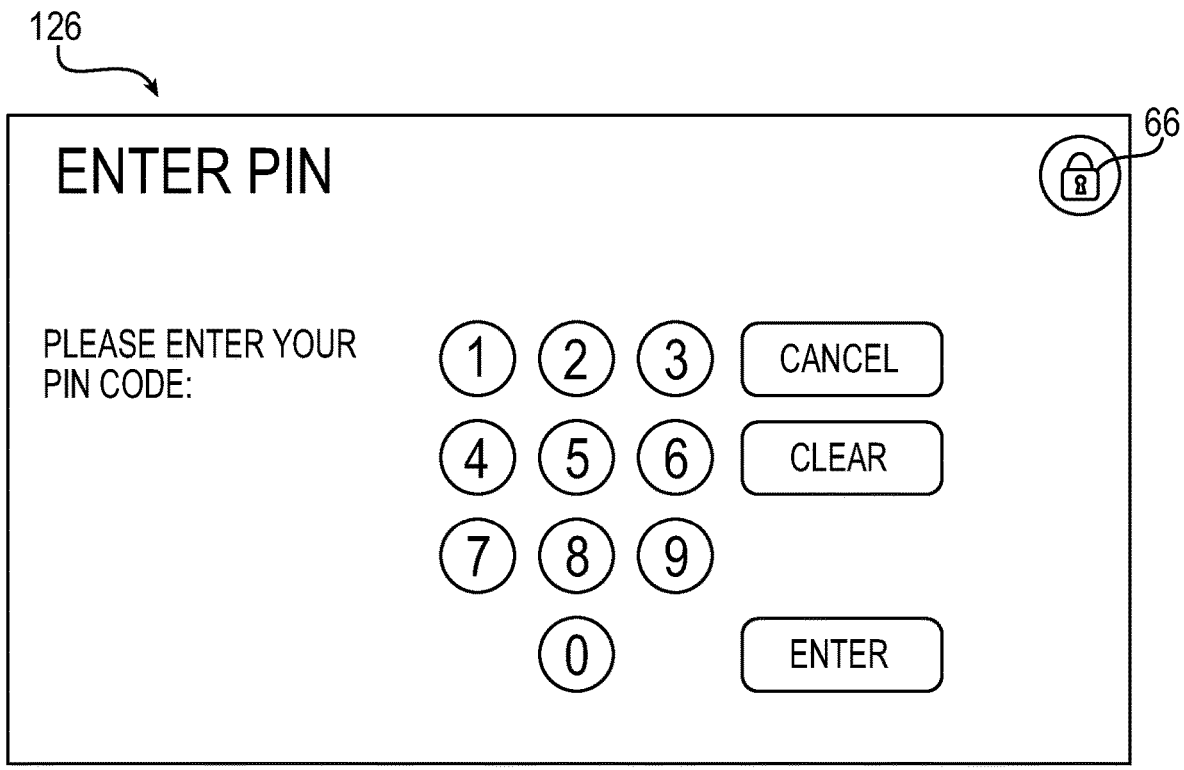
Figure 19:
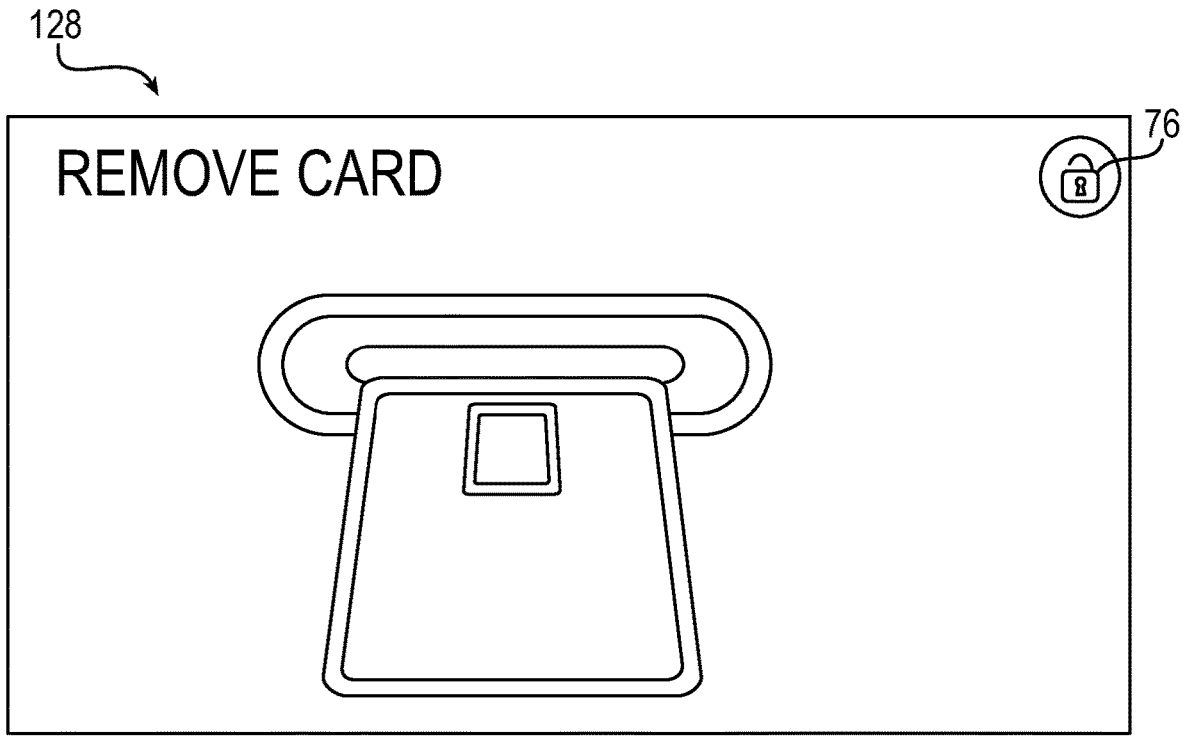

After the card is entered, display 126 in FIG. 18 is displayed. The user is prompted to enter their PIN. The icon 66 is presented to indicate that display 126 is protected. In an example embodiment, display 126 is presented by a SDD in takeover mode. If the card entry is a secure card with PIN entry, the user may then see a display similar to display 128 illustrated in FIG. 19. The display 128 prompts the user to remove their card from the card reader. The unlocked padlock 76 indicates that the display 128 is unprotected.

Figure 20:
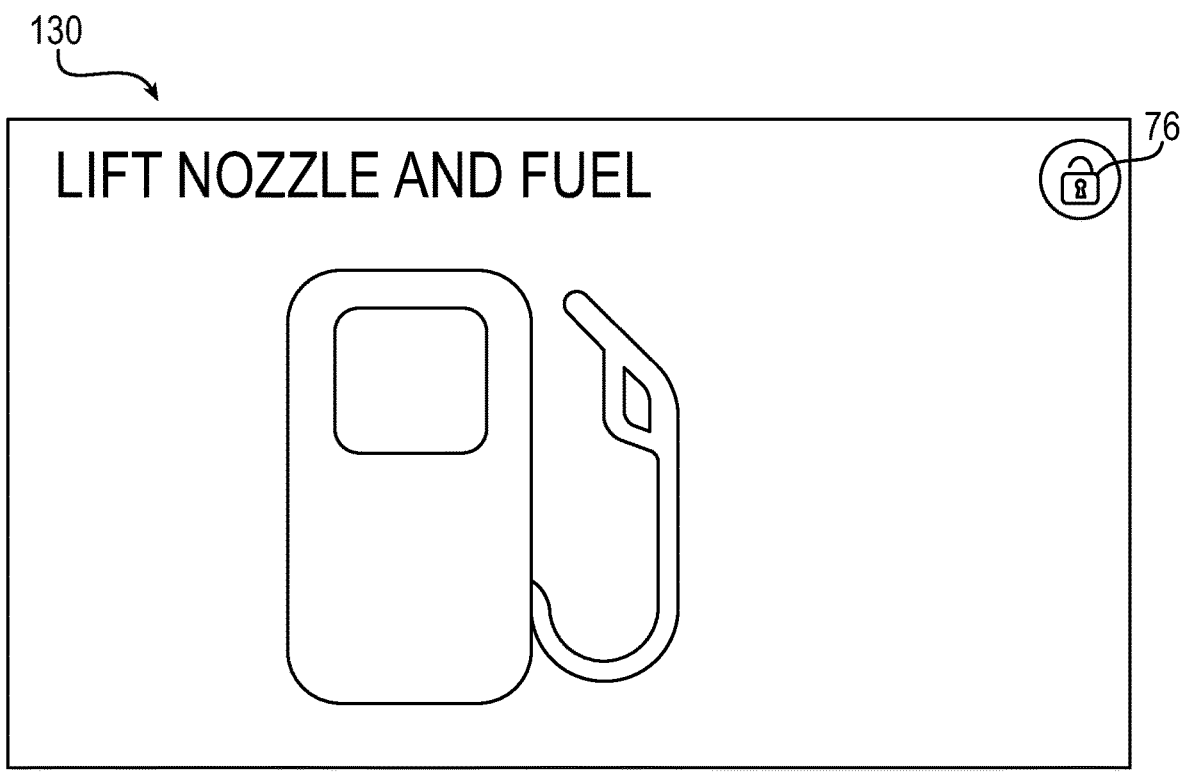
Figure 21:
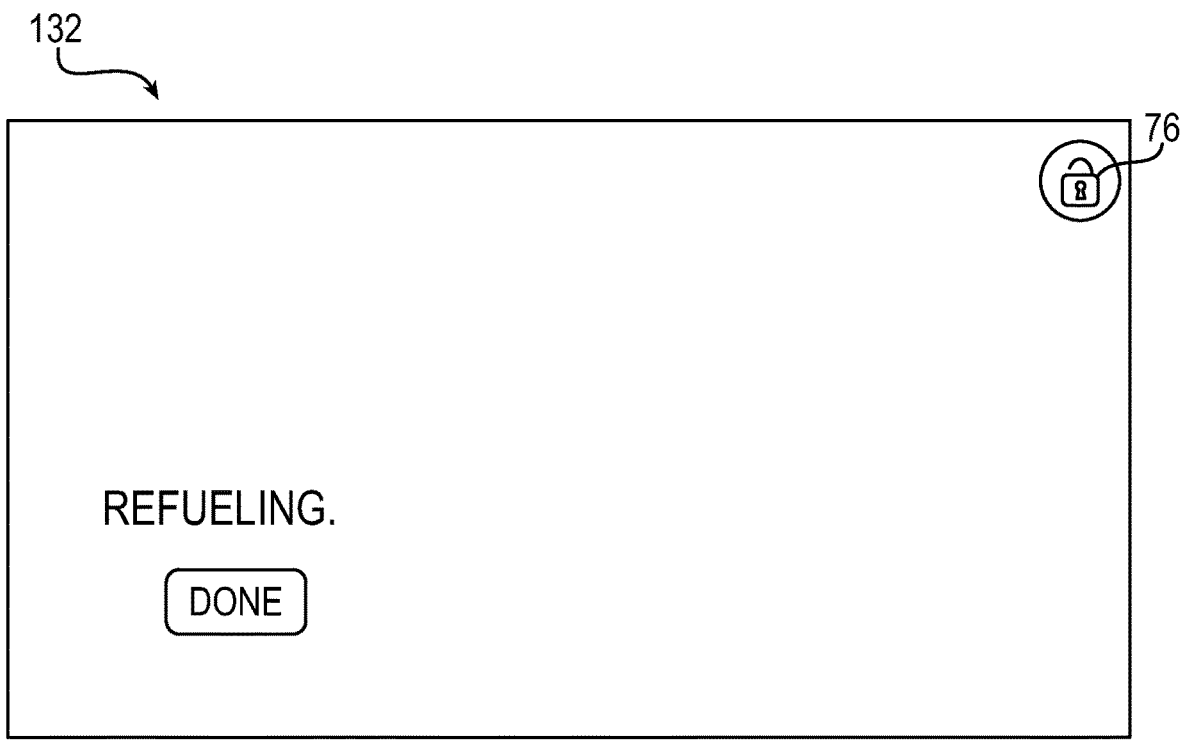

Once the transaction is approved, the use may be presented with the display 130 illustrated in FIG. 20. This display indicates that the user should begin fueling. The unlocked padlock 76 indicates that the display 130 is unprotected. In an example embodiment, the user may be presented with display 132 illustrated in FIG. 21. The display 132 instructs the user to push the "Done" button when the user has completed refueling. The unlocked padlock 76 on the display 132 indicates that the display 132 is unprotected.

Figure 22:
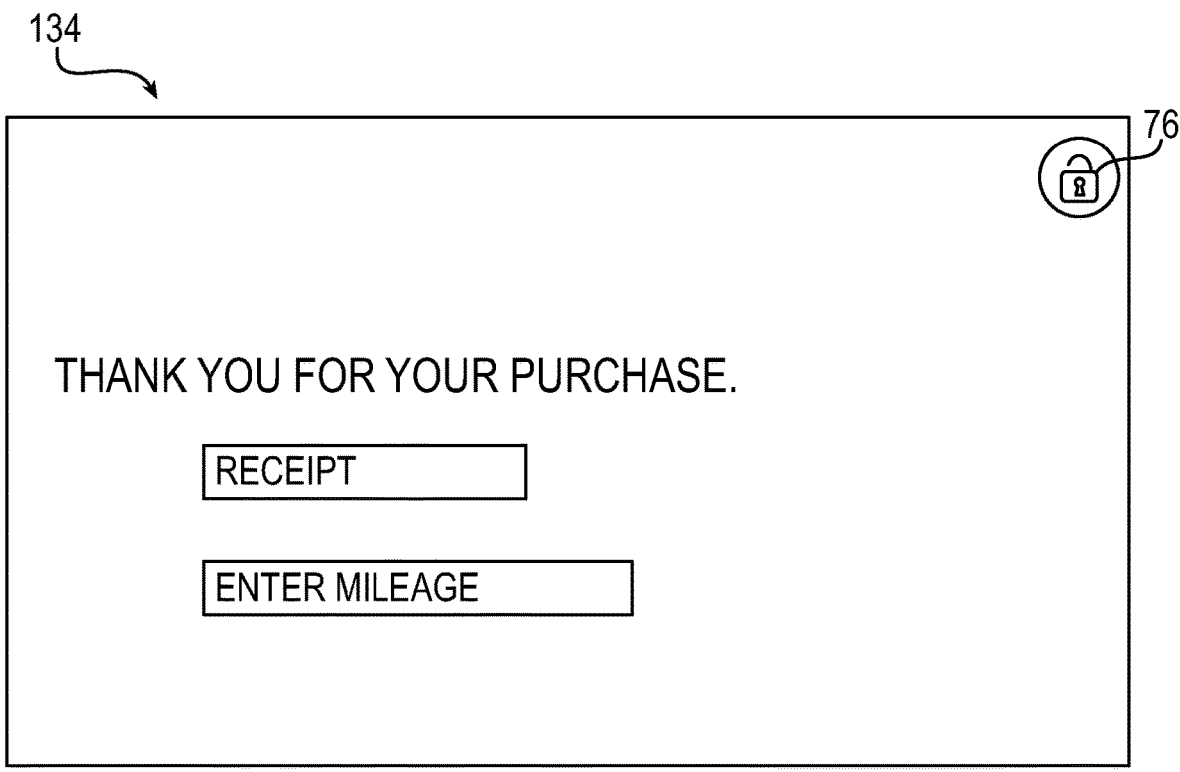
Figure 23:
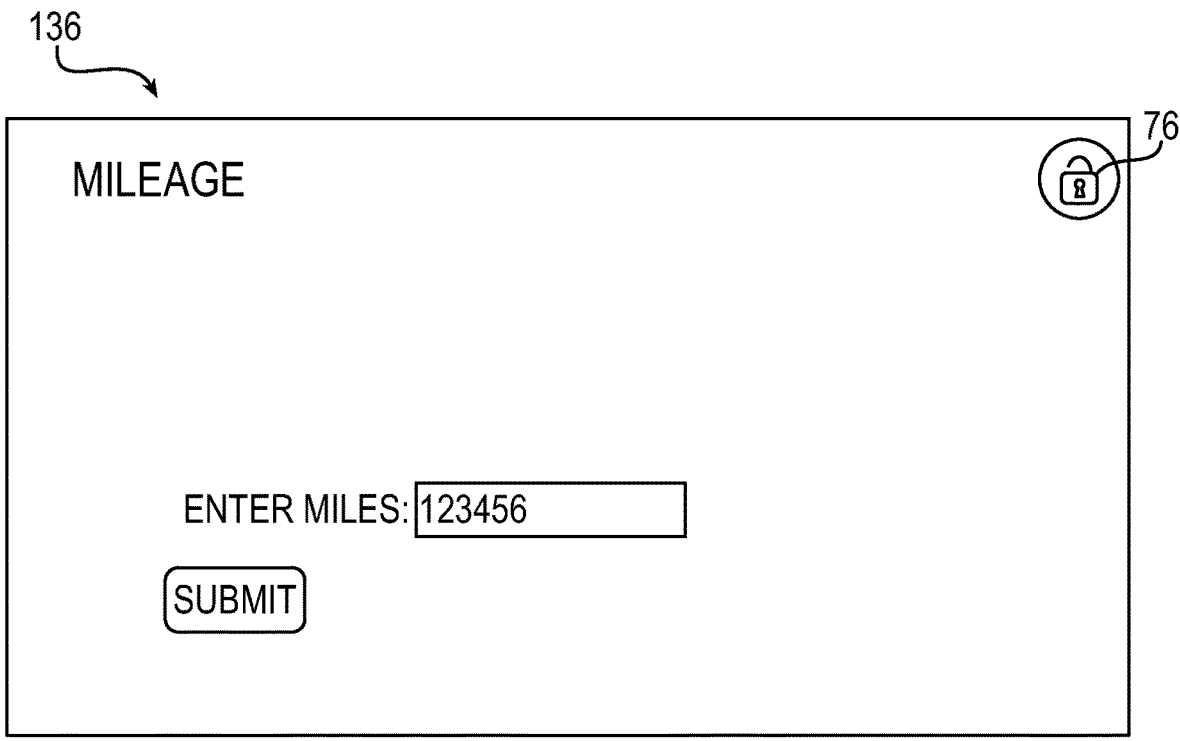
Figure 24:
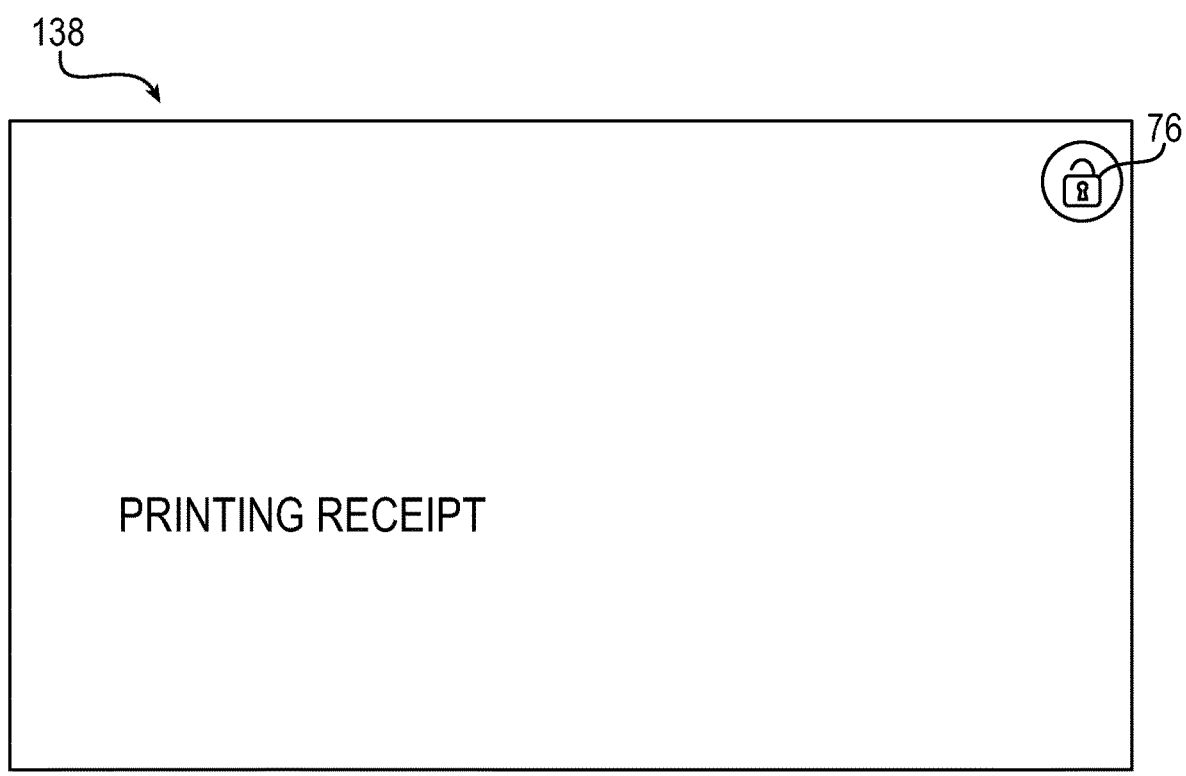

In an example embodiment, after the user is fueling, the display 134 in FIG. 22 may be presented to the user prompting the user to input whether they would like to a receipt and/or enter their mileage. The unlocked icon on the display 134 indicates that the display 134 is unprotected. If the user elects to enter their mileage, the display 136 is presented to the user. The unlocked padlock 76 indicates that the display 136 is unprotected.

The display 138 is presented to the user if the user elects to print a receipt in the display 134 in FIG. 22. The unlocked padlock 76 indicates that the display 138 is unprotected.

Figure 25:
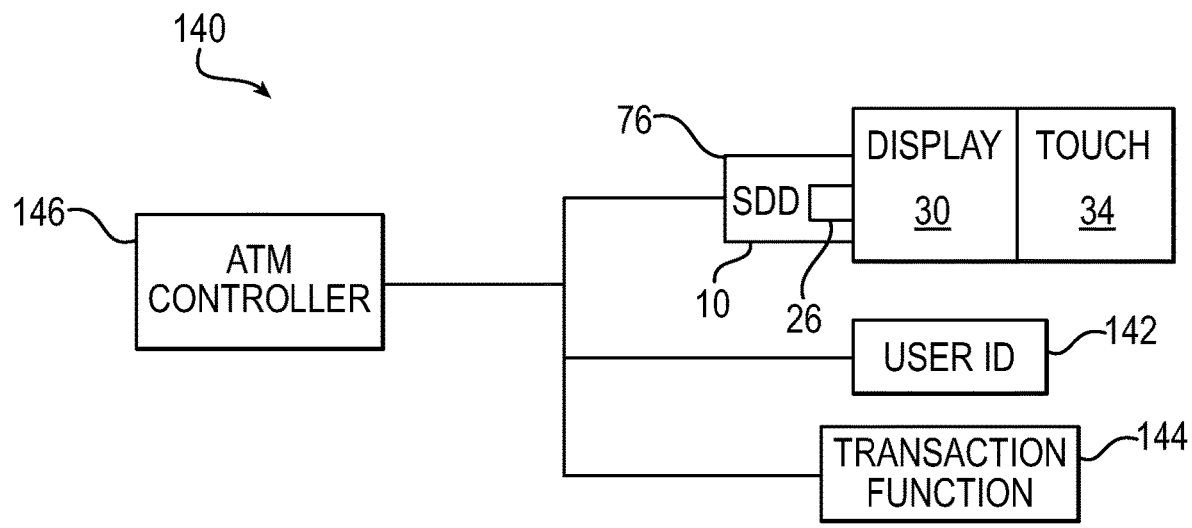
FIG. 25 is an example of an automated banking machine with a secure display device.

FIG. 25 is an example of an automated banking machine (such as an automated teller machine or "ATM") 140 with a secure display device 10. The ATM 140 comprises display 30 with a touch screen 34 coupled to SDD 10. Removal detector 26 is employed to detect whether SDD 10 is properly coupled with display 30. The user identification device 142 may be any satiable device for determining the identity of a customer. Examples of user identification device include, but are not limited to a magnetic stripe (card) reader, a radio frequency identifier (RFID) reader, a wireless (such as WIFI, BLUETOOTH, or near field communication "NFC") reader, biometric reader, or any combination of the aforementioned user identification devices. The ATM 140 also includes a transaction function device 144. The transaction function device 84 may include, but is not limited to, a cash dispenser, a cash receiver, a cash recycler, a check depositing device, receipt printer, or any other device or combination of devices for conducting a financial transaction. The ATM controller 146 comprises logic for conducting financial transactions. The ATM controller 146 may be co-located with the ATM 140, or in particular embodiments, may be located remotely.

In an example embodiment, the ATM controller 146 may be considered trusted and thus be allowed to change the operating state of the SDD 10. For example, while conducting a financial transaction the ATM controller 80 may have the SDD 10 operate in the second (takeover) mode while obtaining PIN inputs, and have the SDD 10 operate in any other mode at other times, such as for example, operating in the pass through mode while no transactions are being conducted to allow advertisements to be presented on the display. As another example, multiple outputs operating in different modes may be provided to display 30 at the same time. For example, a first portion of the display 30 can be used for performing financial transactions and may operate in either the first (partial takeover) or second (takeover) modes, while a second portion of the screen may output advertisements and operate in the third (pass through) mode.

Figure 26:
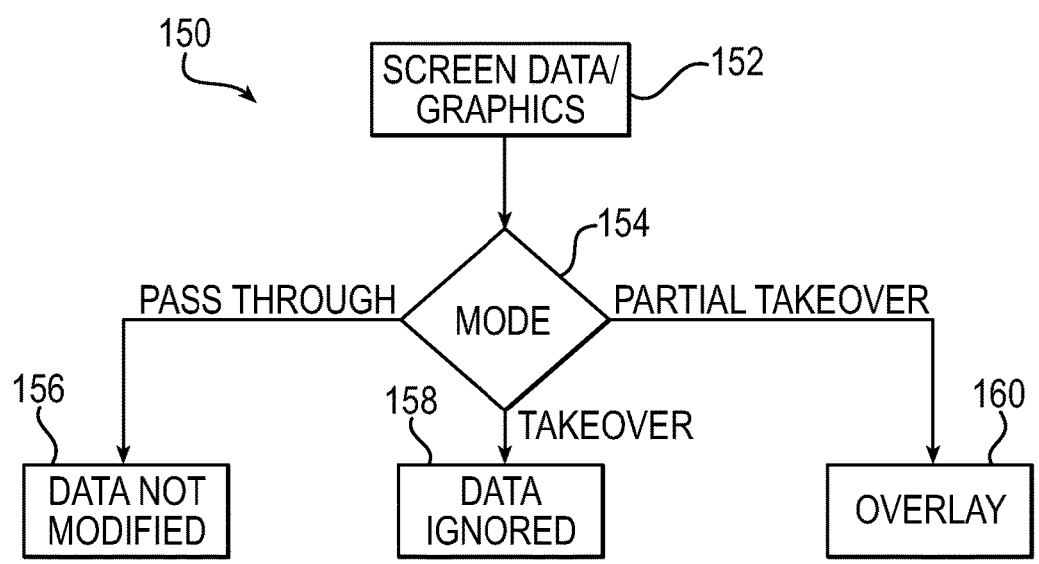
FIG. 26 is a block diagram illustrating a methodology for handling data for a screen display.

In view of the foregoing structural and functional features described above, a methodology 150 in accordance with an example embodiment will be better appreciated with reference to FIG. 26. While, for purposes of simplicity of explanation, the methodology 150 of FIG. 26 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodology 150 described herein is suitably adapted to be implemented in hardware, software when executed by a processor, or a combination thereof. For example, methodology 150 may be implemented by secure display logic 22 (FIGS. 1-4) or processor 508 in FIG. 5.

At 152, screen data is received. The screen data may include graphical data to be output on a display.

At 154, the operational mode is determined. The screen data is processed depending upon the operational mode.

If the current operational mode at 154 is a "pass through" mode, (PASS THROUGH) then all screen data is forwarded to the display unmodified as illustrated at 156. Unlike takeover mode or partial takeover mode, no indication would be provided to indicate whether the touch screen is in a protected or unprotected mode. In an example embodiment, touch inputs in this mode would be encrypted or restricted to prevent PIN luring or phishing attacks.

If the current operational mode at 154 is a secure or "takeover" mode (TAKEOVER), the screen data is ignored or discarded as indicated at 158. In this mode, the SDD outputs a selected, predefined display. Depending on the task being performed, multiple outputs may be provided in a sequence. For example, performing the sequence illustrated in FIGS. 13-24. As another example, for a cash withdrawal transaction at an ATM, (for example the ATM 140 illustrated in FIG. 25), a first screen for requesting user identification (e.g., insert a magstripe card, wait for a wireless signal from a device associated with a user, or wait for a biometric input) may be followed by a second screen requesting a PIN input that is followed by a third screen requesting the amount of the withdrawal, etc. In particular embodiments, a visual representation such as an icon may be provided to the display to indicate whether the display is secure. For example, if a removal device detects tampering, a message may be output on the display indicating tampering has occurred or that the device is unavailable.

If, at 154, the operation mode is a "partial takeover" mode (PARTIAL TAKEOVER), the screen data is provided to the display, however, other graphical data is provided to overlay at least a portion of the screen data. For example, screen data may be forwarded to the display and an overlay with a visual indication, such as an icon may be provided to overlay the screen data to indicate whether the touch screen inputs of an associated display are secure as indicated by 160. For example, if touch screen inputs are being encrypted or restricted, the touch screen may be considered secure even though some elements on the display are insecure. If touch screen inputs are not secure (e.g., not encrypted or restricted), a visual representation may be provided that indicates the display and/or touch screen inputs are insecure.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
   a secure display input;
   a secure display output; and
   secure display logic coupled with the secure display input and the secure display output;
   the secure display logic is operable to obtain data representative of a screen display via the secure display input;
   the secure display logic is operable to selectively output the data representative of the screen display via the secure display output based on an operational mode;
   wherein while operating in a first operational mode, the secure display logic is operable to output an overlay via the secure display output that overlays a portion of the screen display with a predefined graphic
   wherein while operating in a second operational mode, the secure display logic is operable to prevent the data representative of the screen display from being output on the secure display output and instead provides a selected screen output to the screen display output; and
   wherein while operating a third operational mode, the secure display logic is operable to send the data representative of the screen display to the secure display output unmodified.

2. The apparatus set forth in claim 1, wherein the secure display logic is further operable while in the second operational mode to provide a visual indication of a security state of a display.

3. The apparatus set forth in claim 2, wherein the secure display logic is further operable to communicate with a secure cryptographic device associated with the display coupled with the secure display output.

4. The apparatus set forth in claim 3, wherein the operational mode is based at least in part on an operational mode of the secure cryptographic device; and wherein the secure display logic is operable to operate in the third mode responsive to the secure cryptographic device being in an operational mode that encrypts inputs from a touch screen.

5. The apparatus set forth in claim 4, further comprising a removal detector;
wherein the secure display logic is operable to send a signal to disable the secure cryptographic device responsive to the removal detector detecting a removal event.

6. The apparatus set forth in claim 5, wherein the secure display logic is operable to operate in the second mode responsive to receiving a signal from the secure cryptographic device indicative of a tampering event; and
wherein the selected screen output indicates one of a group consisting of the display is not operational and data representative of a tampering event.

7. The apparatus set forth in claim 3, wherein the secure display logic is at least in part controlled by the secure cryptographic device.

8. The apparatus set forth in claim 2, wherein the predefined graphic comprises one of a group consisting of a sequence of a plurality of predefined graphics and a video stream.

9. The apparatus set forth in claim 2, further comprising a memory for storing the selected screen output and the predefined graphic.

10. The apparatus set forth in claim 9, wherein the predefined graphic includes one of a group consisting of a first icon and a second icon corresponding to a security state of the display.

11. The apparatus set forth in claim 10, wherein the first icon comprises visual representation of a locked padlock corresponding to a first security state.

12. The apparatus set forth in claim 11, wherein the first icon comprises a first color corresponding to the first security state.

13. The apparatus set forth in claim 12, wherein the second icon comprises a visual representation of an unlocked padlock corresponding to a second security state.

14. The apparatus set forth in claim 13, wherein the second icon comprises a second color corresponding to the second security state.

15. The apparatus set forth in claim 1, further comprising a removal detector that protects a connection between the secure display output and a display device coupled with the secure display output.

16. The apparatus set forth in claim 15, wherein the removal detector is operable to detect one of a group consisting of force, pressure, magnetism, capacitance, and inductance.

17. The apparatus set forth in claim 15, where the removal detector comprises a mesh with electrically conductive tracks.

18. The apparatus set forth in claim 17, wherein the secure display logic is operable to operate in the second mode responsive to the removal detector detecting tampering.

19. The apparatus set forth in claim 18, wherein the secure display logic is operable to send a message via one of a group consisting of the secure display input and a communication interface to a predefined destination responsive to the removal detector detecting tampering.

20. A tangible, non-transitory computer readable medium with instructions encoded thereon for execution by a processor, and when executed operable to:
obtain data representative of a screen display; and
selectively output the data representative of the screen display based at least in part on an operational mode;
wherein while operating in a first operational mode, the data representative of the screen display is provided to a screen display output and a portion of the screen display is overlaid with a predefined graphic;
wherein while operating in a second operational mode, preventing the data representative of the screen display from being output on the secure display output and instead provides a selected screen output to the screen display output; and
wherein while operating a third operational mode, the secure display logic is operable to send the data representative of the screen display to the secure display output unmodified.

21. A method, comprising:
receiving data representative of a screen display;
operating a processor to selectively output the data representative of the screen display based on an operational mode;
wherein while operating in a first operational mode, a secure display logic is operable to output an overlay via a secure display output that overlays a portion of the screen display with a predefined graphic;
wherein while operating in a second operational mode, the secure display logic is operable to prevent the data representative of the screen display from being output on the secure display output and instead provides a selected screen output to the screen display output; and
wherein while operating in a third operational mode, the secure display logic is operable to send the data representative of the screen display to the secure display output unmodified.

22. The apparatus set forth in claim 1, further comprising:
a touch screen;
a secure cryptographic device that comprises secure cryptographic logic that is communicatively coupled to the touch screen and the secure display logic;
the secure cryptographic logic is operable to receive data representative of touch coordinates from the touch screen and is operable to output the data representative of the touch coordinates based on a secure cryptographic device operational mode;
wherein while the secure cryptographic device is operating in a first secure cryptographic device operational mode output of the data representative of touch coordinates is encrypted;
wherein while the secure cryptographic device is operating in a second secure cryptographic device operational mode output of the data representative of touch coordinates is in clear text;
wherein while the secure cryptographic device is operating in a third secure cryptographic device operational mode output of data indicating a touch was detected is sent instead of data representative of touch coordinates;
the secure display logic is operable to limit the operational mode of the secure display device based on a current secure cryptographic device operational mode;

wherein the secure display logic is operable to limit the operational mode to the third operational mode while the secure cryptographic device operational mode is the third mode; and wherein the secure display logic is operable to limit the operational mode to a mode selected from the first mode and second mode while the secure cryptographic device operational mode is the second mode.

\* \* \* \* \*